United States Patent
Deane et al.

[11] Patent Number: 5,394,963
[45] Date of Patent: Mar. 7, 1995

[54] COMPOSITE CAST BRAKE CALIPER

[75] Inventors: Alastair R. Deane, Novi; John Vergoz, Bloomfield Hills, both of Mich.

[73] Assignee: The Budd Company, Troy, Mich.

[21] Appl. No.: 79,628

[22] Filed: Jun. 18, 1993

[51] Int. Cl.⁶ .................. F16D 55/00; B60T 11/00
[52] U.S. Cl. .................. 188/73.31; 188/71.1; 188/71.6; 188/73.35; 188/264 D; 188/264 P
[58] Field of Search ............ 188/71.1, 71.6, 72.4, 188/73.31, 370, 264 D, 264 P, 264 R, 264 CC, 264 G, 218 R, 73.35, 274, 72.5, 73.47, 264 F; 192/113.31, 113.3; 164/112, 97

[56] References Cited

U.S. PATENT DOCUMENTS

| | | | |
|---|---|---|---|
| 1,079,550 | 11/1913 | Harris | 164/112 X |
| 1,484,434 | 2/1924 | Thompson | 164/112 X |
| 1,972,353 | 9/1934 | North et al. | |
| 2,378,516 | 6/1945 | Timmerman et al. | 188/264 D |
| 2,844,855 | 7/1958 | Gadd et al. | 188/264 CC |
| 2,889,897 | 6/1959 | Sanford et al. | 188/71.6 X |
| 3,000,472 | 4/1959 | Sturgis | |
| 3,018,853 | 11/1961 | Thomas et al. | |
| 3,022,867 | 2/1962 | Maloney et al. | |
| 3,063,532 | 11/1962 | Jaeschke | 192/113.31 |
| 3,590,960 | 6/1969 | Reynolds | |
| 3,612,224 | 6/1969 | Walther | |
| 3,850,267 | 11/1974 | Odier | |
| 3,915,262 | 10/1975 | Klaue | |
| 3,997,032 | 7/1976 | Kondo | |
| 4,344,477 | 8/1982 | Miki et al. | 164/112 X |
| 4,381,336 | 4/1983 | Ostwald | 188/73.31 X |
| 4,440,270 | 11/1983 | Ross | |
| 4,508,200 | 4/1985 | Cigognino | 188/264 P |
| 4,754,856 | 4/1988 | Villata | |
| 4,799,575 | 1/1989 | Kroniger | |
| 4,828,089 | 5/1989 | Collins et al. | 188/71.6 X |
| 4,865,168 | 9/1989 | Campbell et al. | |
| 4,883,149 | 11/1989 | Campbell et al. | |
| 5,115,891 | 5/1992 | Raitzer et al. | 188/218 R |
| 5,234,080 | 8/1993 | Pantale | 188/73.31 X |
| 5,241,737 | 9/1993 | Colvin | 164/112 X |
| 5,251,683 | 10/1993 | Backer | 164/112 X |

FOREIGN PATENT DOCUMENTS

| | | | |
|---|---|---|---|
| 2484581 | 12/1981 | France | 188/264 D |
| 1903437 | 8/1970 | Germany | 188/71.6 |
| 4202394 | 10/1992 | Germany | 188/71.1 |
| 62-13832 | 1/1987 | Japan | 188/73.31 |
| 62-56630 | 3/1987 | Japan | 188/73.31 |
| 62-56631 | 3/1987 | Japan | 188/73.31 |
| 63-149436 | 6/1988 | Japan | 188/370 |
| 2-159431 | 6/1990 | Japan | 188/71.6 |
| 2087490 | 5/1982 | United Kingdom | 188/71.1 |

Primary Examiner—Douglas C. Butler
Attorney, Agent, or Firm—Harness, Dickey & Pierce

[57] ABSTRACT

A composite cast caliper in which the body of the caliper is cast with an additional component embedded therein. The embedded or intra-cast component can be either a reinforcing structure to strengthen and prevent deflection of the caliper body or it can be a tube providing a coolant passage within the caliper. The coolant passage tube is connected to a source of coolant fluid for circulation through the caliper to remove heat therefrom. The embedded component is positioned within the casting mold by the use of a plurality of locating wires.

1 Claim, 4 Drawing Sheets

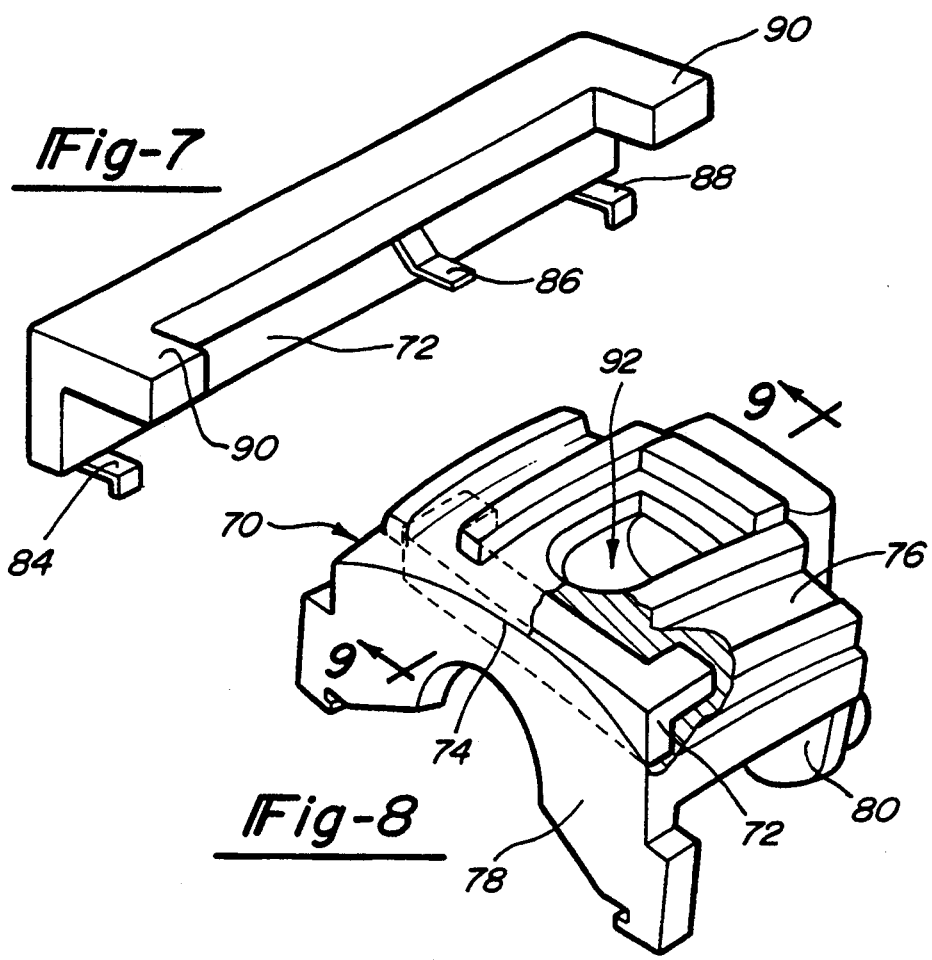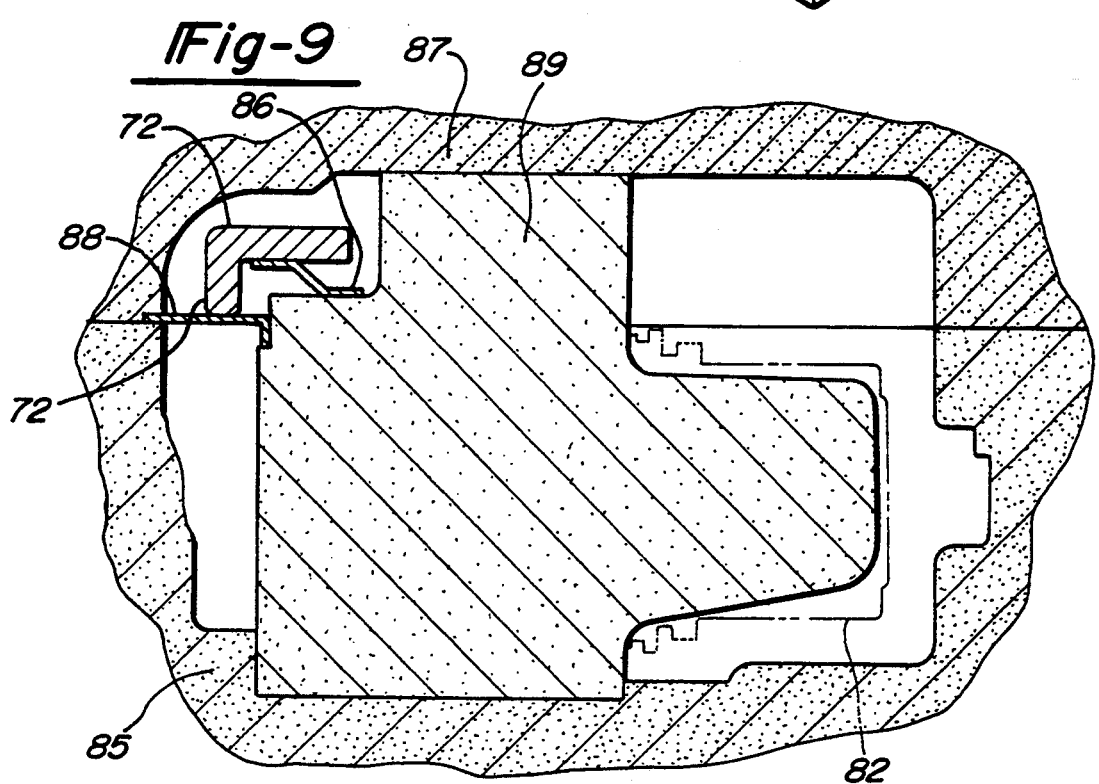

COMPOSITE CAST BRAKE CALIPER

BACKGROUND AND SUMMARY OF THE INVENTION

The present invention relates to a composite cast brake caliper having one or more components embedded within the cast metal forming the caliper providing thermal and/or structural benefits.

Various factors effect the performance characteristics of disk type brakes. Among these factors are brake fluid displacement and the brake temperature. The quantity of fluid displacement in a disk brake hydraulic system is dependent upon the strength or compliance of the disk brake calipers since bending deflection of the caliper increases caliper piston movement. Brake torque is increased by increasing the hydraulic pressure in the brake system. As the hydraulic pressure is increased, however, the strength of the disk brake caliper must also be increased to maintain brake fluid displacement within acceptable levels. Brake designers attempt to minimize brake fluid displacement as a means of improving braking modulation, especially in connection with anti-lock braking systems (ABS).

One method to increase the strength of the caliper is to increase the section thickness of the caliper. However, this increases the quantity of material used increasing the weight and size of the caliper. The present invention, by casting the brake caliper with an imbedded reinforcing member, results in an increase of the caliper strength without increasing its size or weight. Alternatively, if increased strength is not needed, the composite caliper can be used to reduce the quantity of metal used and thereby decrease the caliper weight for a particular caliper strength.

Heat generation in brake system components causes brake fade. Brake fade is a decrease in braking torque with increased brake temperature. Increasing the brake component mass to create a larger heat sink, use of alternative materials and the addition of cooling fins are three options to create better heat dissipation. However, these options also affect vehicle performance due to an increase in the unsprung weight. In one embodiment of the present invention, the brake caliper is provided with one or more imbedded coolant tubes enabling the removal of heat from the brake components by circulating a liquid coolant. This reduces the occurrence of brake fade without adding to the unsprung weight.

The composite brake caliper of this invention includes the addition of one or more components embedded within the cast metal body of the caliper. The embedded component can be a reinforcing block, a reinforcing wire form or a hollow tube creating a coolant passage. In the later case, the ends of the tube are accessible from the exterior of the caliper for connection to a circulating coolant liquid. The reinforcing members can be entirely embedded within the cast metal caliper.

A coolant system for liquid cooled calipers includes a heat exchanger and a pump for circulating the coolant. Preferably an existing automotive heat exchange system such as the engine cooling system is used. Hot fluid flows from the brakes to the pump, is pumped through the heat exchanger and back to the brake. As a result of cooling, the caliper and brake lining temperatures can be maintained so as to prevent brake fade.

Further objects, features and advantages of the invention will become apparent from a consideration of the following description and the appended claims when taken in connection with the accompanying drawings.

BRIEF DESCRIPTION OF THE DRAWINGS

FIG. 7 is a perspective view of the reinforcing block shown in the caliper in FIG. 8;

FIG. 8 is a perspective view of the composite cast caliper having a reinforcing block embedded therein; and FIG. 9 is a sectional view of a casting mold for the caliper shown in FIG. 8, with a reinforcing block embedded therein.

DETAILED DESCRIPTION OF THE INVENTION

Figure 1:
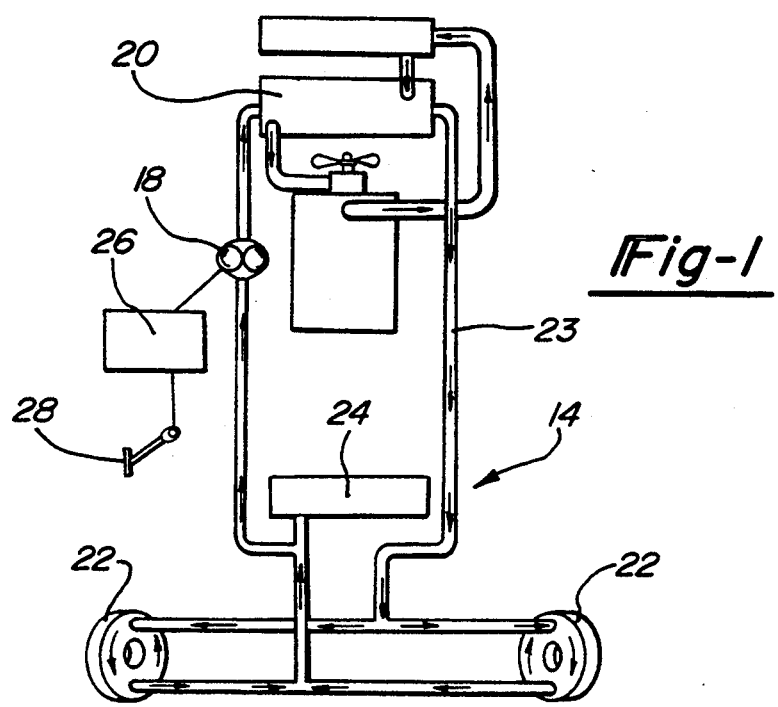
FIG. 1 is a schematic diagram of a coolant system for cooling the brake caliper.
Figure 2:
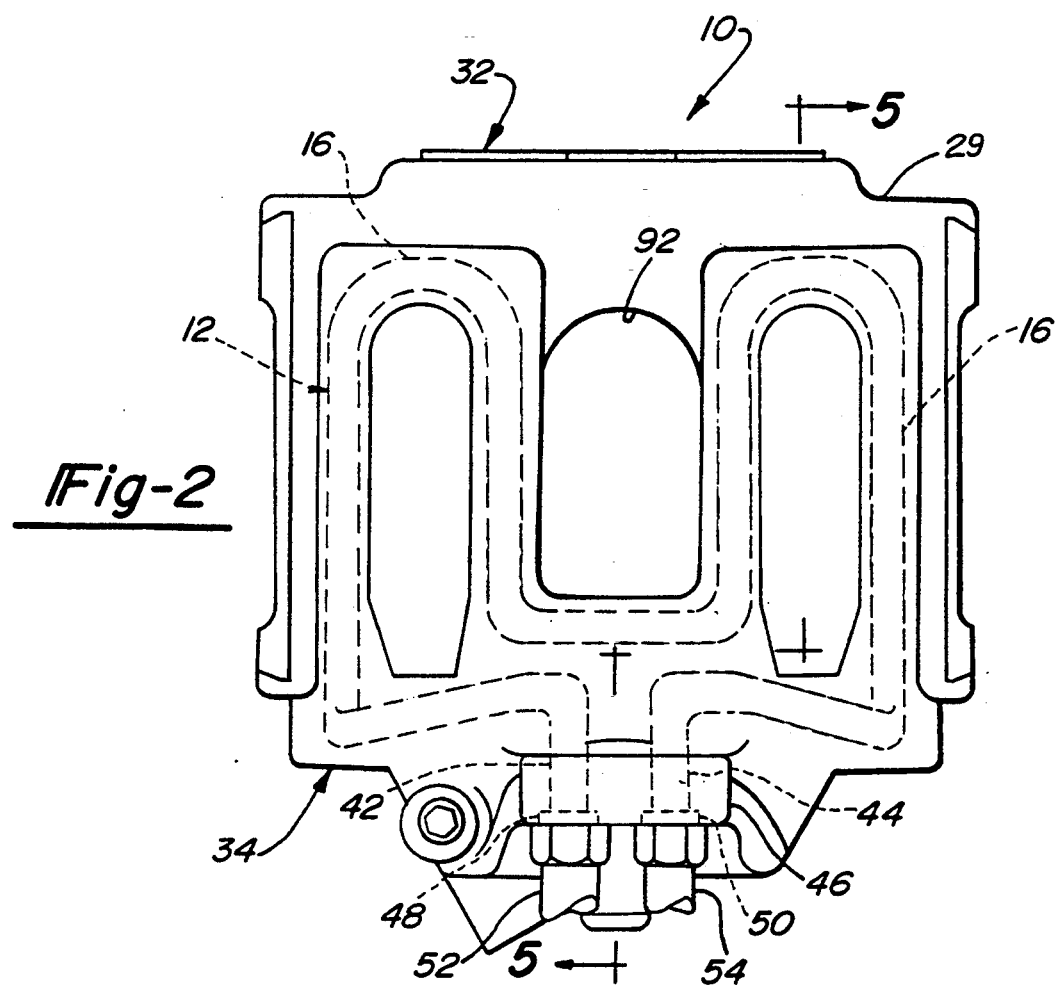
FIG. 2 is a top view of a brake caliper with a composite cast tube forming a coolant passage through the caliper.
Figure 3:
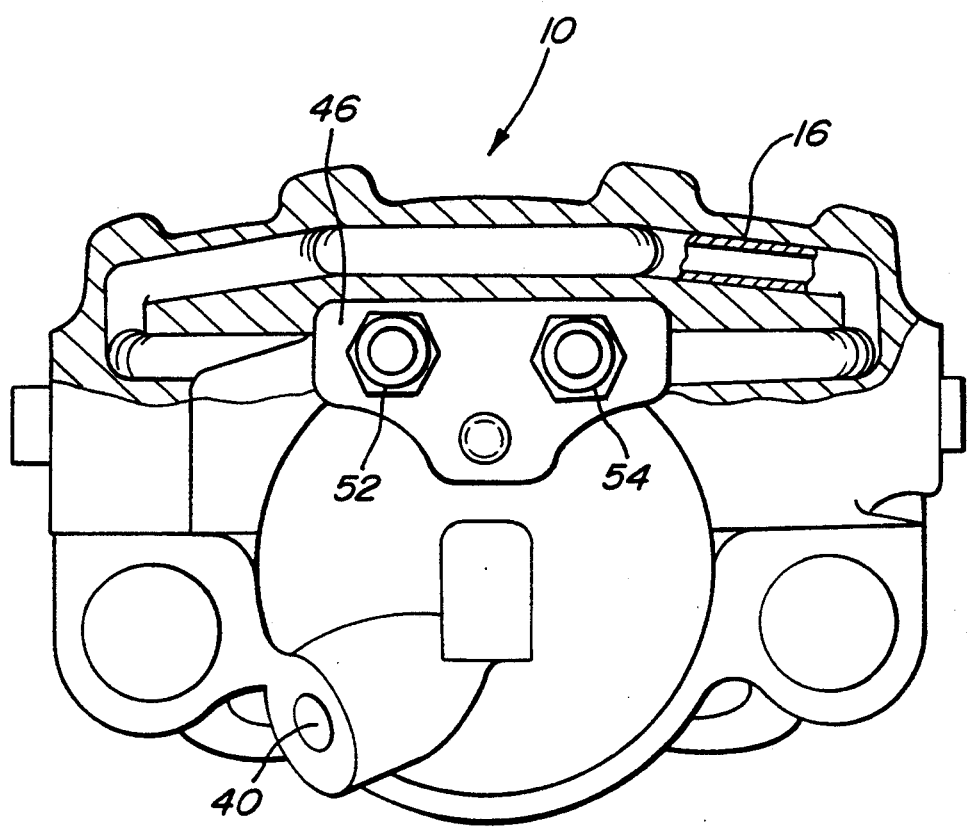
FIG. 3 is a side elevational view of brake caliper shown in FIG. 2.
Figure 4:
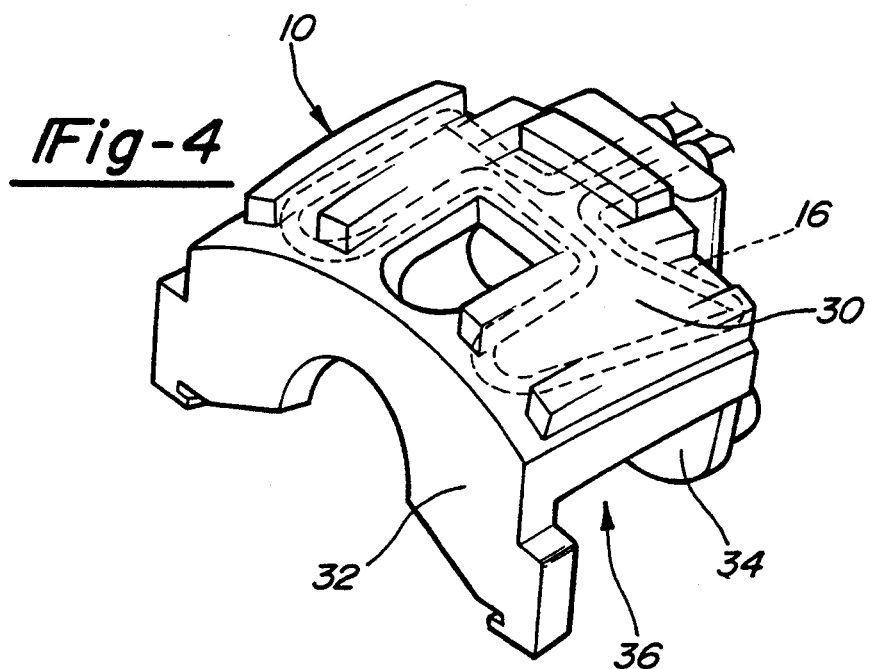
FIG. 4 is a perspective view of the brake caliper shown in FIGS. 2 and 3.

One embodiment of the composite brake caliper of the present invention having a coolant passage is shown in FIGS. 2–4 and designated as 10. The caliper 10 includes a coolant passage 12 cast therein and described in greater detail below. The caliper 10 is one component of a larger brake cooling system 14 shown schematically in FIG. 1.

The brake cooling system 14 includes a pump 18 which pumps a cooling fluid through a coolant circuit 23 including a heat exchanger 20 such as a vehicle radiator. The coolant fluid is then directed to the brakes 22 where it flows through the passage 12 in the calipers 10. From the caliper, the coolant flows to either a reservoir 24 or directly to the pump 18 and to the heat exchanger. To regulate the brake temperature, a control module 26 can be included to operate the pump 18. The control module can optionally receive input of brake application from the brake pedal 28.

The caliper 10 is of a typical structure for a disk brake caliper. Caliper 10 includes a top portion or bridge 30 with a pair of spaced flanges 32 and 34 extending therefrom forming a generally U-shaped caliper body 29. The opening 36 between the two flanges receives a peripheral portion of the brake rotor. Flange 34 forms a cylinder 38 for reception of a brake piston (not shown) which carries a brake pad. The cylinder 38 and the piston define a closed chamber within the flange 34 for the brake fluid. A fitting 40 is used to connect a brake line to the closed chamber providing a circuit for the hydraulic brake fluid in a conventional manner. Upon application of the brakes, the piston and brake pad are caused, by the brake fluid, to move toward the brake rotor.

To prevent brake fade, it is necessary that the heat generated by the brakes be removed from the caliper and rotor. The body of caliper 10 is cast with a hollow tube 16 embedded therein forming the coolant passage 12 in the caliper body. The hollow tube 16 is preferably made out of steel with its two ends 42 and 44 brazed to a banjo block 46. Banjo block 46 is formed with a pair of fittings 48 and 50 for connection to coolant lines 52 and 54 that provide coolant to the tube 16 and removes the coolant after it has passed through the caliper.

Figure 5:
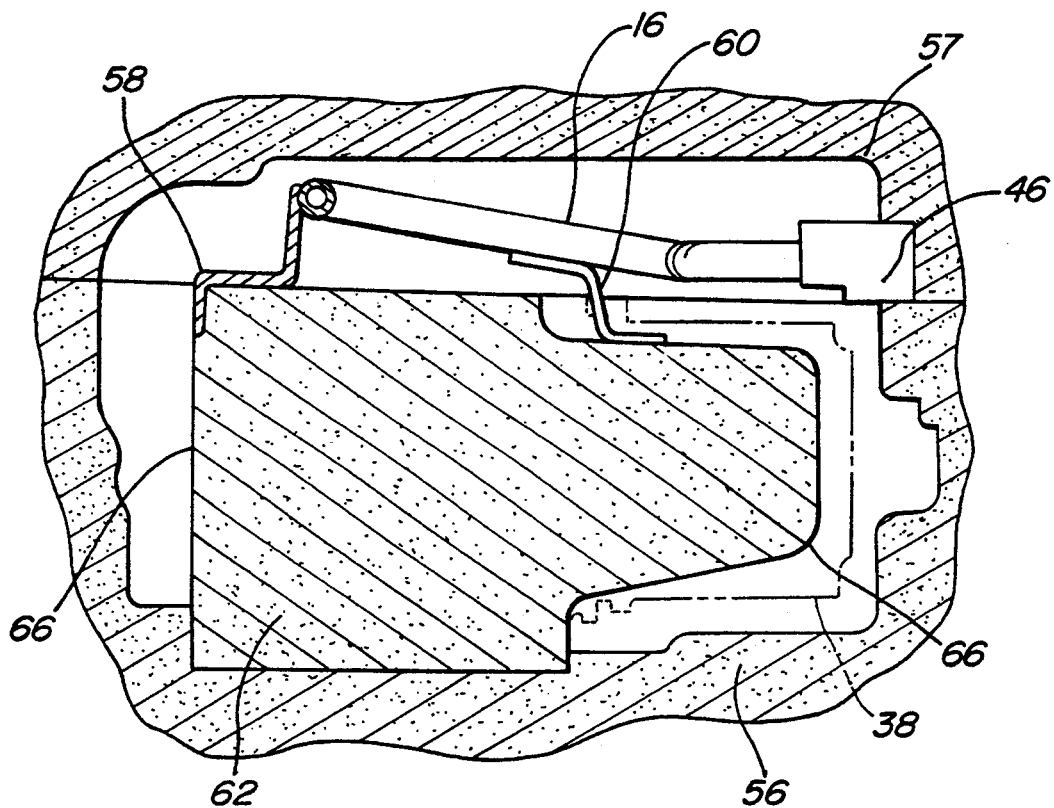
FIG. 5 is a sectional view of a mold for casting the caliper of the present invention with a coolant tube or wire reinforcement.

The caliper 10 is cast within a sand mold composed of mold halves 56 and 57 shown in FIG. 5. A sand core 62 is placed in the lower mold half 56. Core 62 forms the open portion between the caliper flanges 32 and 34 and rough forms the cylinder 38 (shown in phantom line) for the brake piston. The sand core 62 and the mold halves 56 and 57 together define a mold cavity having a surface 66. The tube 16 is then placed in the lower mold half with the banjo block 46 resting on the mold edge. Locating wires 58 and 60, brazed to the tube 16, extend therefrom and contact the mold surface. In this manner, the locating wires support the tube in a spaced relation relative to the mold surface 66. Only the ends of the tubes contact the mold surface so that once cast, the tube ends are accessible for fittings. Except for the ends, the embedded tube is spaced from the surface of the caliper.

After the tube 16 is positioned on the core 62 and mold half 56, the mold is closed by the other mold half 57, defining a hollow cavity for the cast metal. Prior to placement of the tube in the mold, the tube is filled with loose sand to prevent its collapse during the casting process. This sand is removed during shake out to remove the casting core. By circulating coolant through the tube 16 as shown in FIG. 1, heat is removed from the caliper, thus cooling the brake.

The fluid displacement in the hydraulic brake system is dependent upon the strength/compliance of the brake calipers. When the brake force is increased by increasing the hydraulic pressure, the compliance of the caliper will result in increased displacement of the brake fluid. By strengthening the caliper to reduce its compliance, the brake system pressure can be increased without a resultant increase in the fluid displacement. In a second embodiment the composite cast brake caliper of the present invention is formed with a reinforcing member to strengthen the caliper and reduce its compliance.

Figure 6:
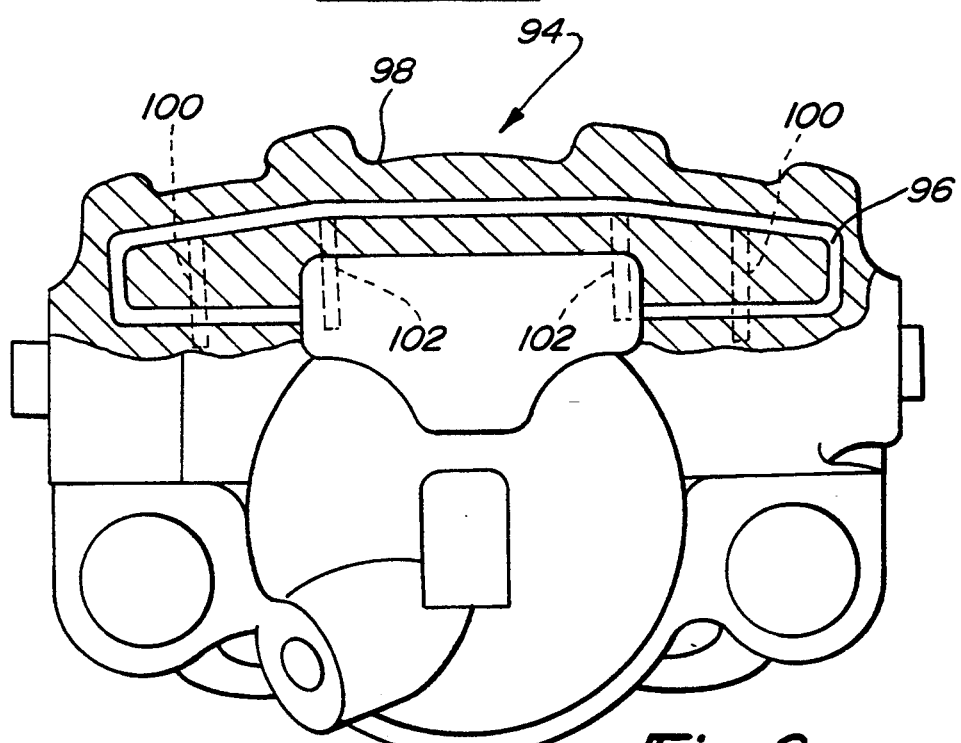
FIG. 6 is a cut away side view of the composite caliper with a wire form reinforcement embedded in the caliper body.

With reference to FIG. 6, a caliper 94 is shown formed with a reinforcing wire 96 cast within the caliper. The reinforcing wire 96 is substantially contained within the bridge 98 of the caliper and follows a route similar to that of the coolant tube 16 in the caliper 10. The steel reinforcing wire provides increased strength to the ductile cast iron of the caliper body. Locating wires 100, 102 are connected to the reinforcing wire to position the reinforcing wire within the cavity of the casting mold.

FIG. 7 shows an alternative reinforcement 72 that can be cast within a caliper. Caliper 70 of FIG. 8 is cast around a reinforcement 72. Reinforcement 72 is an elongated body positioned in the corner region 74 between the caliper bridge 76 and the extending flange 78. The flange 78 only mounts a brake pad while the flange 80 houses the brake piston and a brake pad. The presence of the piston cylinder 82 in flange 80 results in a relatively rigid corner between the flange 80 and bridge 76. In contrast however, the corner 74 between the flange 78 and bridge 76 is relatively compliant. Therefore, the reinforcement 72 is embedded at the corner region 74 to reduce caliper compliance and brake fluid displacement. Steel reinforcement 72 is rigid compared to the cast ductile iron of the caliper and helps to resist bending deflection of the caliper when the brake is applied.

The steel reinforcement 72 has a plurality of locating wires 84, 86 and 88 extending therefrom. The locating wires serve to position the reinforcement 72 within the casting mold 85 shown in FIG. 9. At least three locating wires are used to provide adequate support for the reinforcement. Locating wires 84, 86 and 88 position the reinforcement relative to the sand core 89 and the mold. The reinforcement 72 also has two projecting portions 90 which extend into the bridge 76 on either side of the opening 92 in the bridge.

The composite brake caliper of the present invention provides a cast body caliper with an insert embedded therein. The insert can be either reinforcing to prevent caliper deflection during braking or the insert can provide a passage for a coolant to cool the caliper to reduce brake fade.

It is to be understood that the invention is not limited to the exact construction illustrated and described above, but that various changes and modifications may be made without departing from the spirit and scope of the invention as defined in the following claims.

We claim:

1. A disc brake caliper comprising:
   a generally U-shaped cast body having a pair of generally parallel spaced flanges connected by a bridge, said U-shaped cast body forming an opening for reception of a radially outer portion of a brake rotor, said body having an exterior surface;
   means within said cast body forming a hollow cylinder for a brake piston, said cylinder together with a brake piston defining a closed chamber for a brake fluid;
   means within said cast body forming a passage through said cast body to provide fluid communication between said chamber and the exterior of said body;
   a single piece reinforcing wire embedded substantially within said bridge of said cast body for reinforcing said cast body to reduce deflection thereof under loading, said reinforcing wire having multiple portions extending through said bridge between said spaced flanges; and
   locating wires joined to said reinforcing wire and extending therefrom for positioning said reinforcing wire within said cast body, said locating wires extending from said reinforcing wire to said exterior surface of said cast body.

* * * * *